Figure 1:
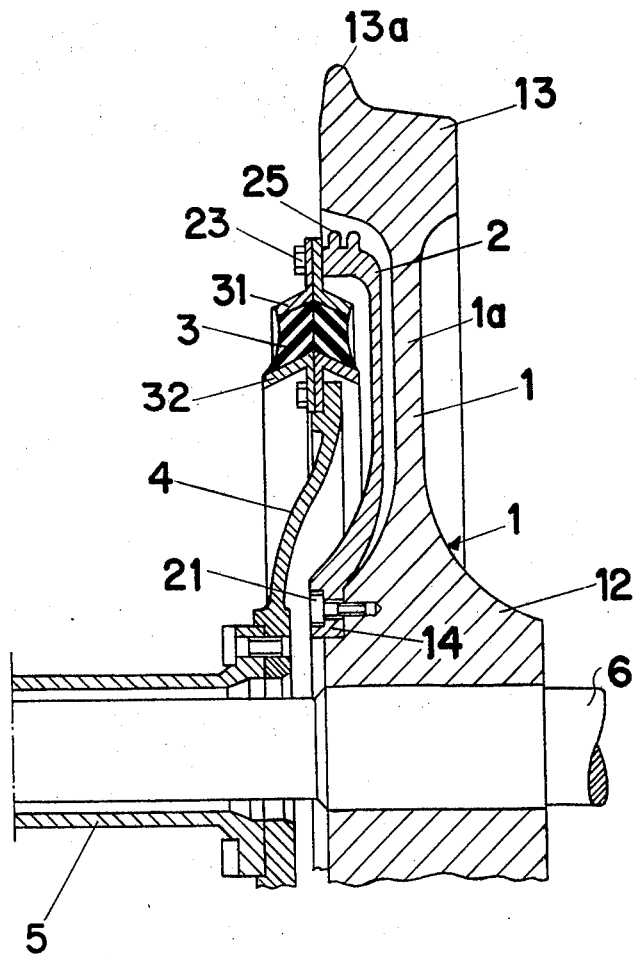

United States Patent [19]

Korber et al.

[11] 4,095,530
[45] Jun. 20, 1978

[54] RESILIENT RAILWAY DRIVE CONNECTION

[75] Inventors: Joachim Korber, Weinheim; Wilhelm Koch, Heidelberg; Heinz Güthlein, Augsburg; Richard Wagner, Ingolstadt; Edmund Frantz, Munich; Paul Kalinowski, Bad Tolz, all of Germany

[73] Assignee: BBC Brown Boveri & Company Limited, Baden, Switzerland

[21] Appl. No.: 602,906

[22] Filed: Aug. 7, 1975

[30] Foreign Application Priority Data

Aug. 8, 1974 Germany .............................. 2438088

[51] Int. Cl.² ...................... B60B 17/00; B60B 19/10; B60B 37/00; B61C 9/44
[52] U.S. Cl. ........................................ 105/131; 295/2
[58] Field of Search .................... 105/131, 135; 295/2, 295/7

[56] References Cited

U.S. PATENT DOCUMENTS

| | | | |
|---|---|---|---|
| 2,365,505 | 12/1944 | Alben | 105/131 |
| 2,404,115 | 7/1946 | Williams | 105/131 |
| 3,661,096 | 5/1972 | Kayserling | 105/131 X |

FOREIGN PATENT DOCUMENTS

| | | | |
|---|---|---|---|
| 246,225 | 4/1966 | Austria | 105/131 |
| 1,455,049 | 2/1969 | Germany | 105/131 |

*Primary Examiner*—Drayton E. Hoffman
*Assistant Examiner*—Howard Beltran
*Attorney, Agent, or Firm*—Burns, Doane, Swecker & Mathis

[57] ABSTRACT

An elastic drive coupling between an electrically powered hollow drive shaft and the drive wheel of a track operated vehicle such as for example an electric locomotive wherein an annular coupling plate is located adjacent to but spaced from the inner side of the drive wheel and the inner periphery of the coupling plate is secured to the hub of the drive wheel. The outermost of two concentric, radially spaced rings surrounding the hollow drive shaft and between which a rubber-containing elastic member is secured, is fixed to the outer periphery of the coupling plate and the innermost ring is fixed to the hollow drive shaft.

5 Claims, 3 Drawing Figures

RESILIENT RAILWAY DRIVE CONNECTION

The present invention relates to an improvement in an elastic drive coupling provided between an electrically powered hollow drive shaft and the drive wheel of a track operated vehicle, the drive coupling being comprised of a rubber-containing elastic member secured between two metallic rings.

This known arrangement connects the electrically driven hollow shaft and wheel axle by way of drive arms with a ring located at the face of the wheel disc, with rubber parts attached by vulcanization to the inner surface of the ring, the inner surfaces of the rubber parts being vulcanized in turn onto the outer surface of another metallic ring. This latter ring is connected to the hub of the drive wheel, thus making possible a transmission of torque from the hollow shaft to the drive wheel. The drive arms protrude outwardly through appropriately dimensioned apertures of the drive wheel.

However, if the drive wheel is of the type that includes a hub, wheel disc and flanged rim, an arrangement of this type will not be feasible any longer because it is not possible for reasons of stability to provide within a wheel disc the apertures of the magnitude required by the drive arms, making it thus necessary to arrange the elastic rubber-containing components inside the drive wheel. It would now be an obvious arrangement, and also simplifying any disassembling, to connect the outer ring, which carries the elastic rubber-containing components, directly with the outwardly facing inside of the drive wheel, and to arrange the spider of the hollow shaft in such manner that it will engage the inner ring. However, if high-speed electrically driven vehicles, e.g. locomotives are braked by means of shoe brakes, the wheel flange head of the wheel set will heat up to such degree that even the convection current of air which arises and cools at the high speeds will not protect the rubber-metal component against excessively high temperatures. These rubber-metal springs will remain fully operational and retain their service life only within certain temperature limits, limits which would certainly be exceeded under the conditions given.

It is therefore the object of the invention to create an elastic drive coupling arrangement of the above-discussed type which will allow sufficient accessibility for purposes of disassembly and where any inadmissible heating-up of the rubber-containing components during the braking by means of shoe brakes is definitely avoided.

The invention solves the problem faced by the arrangement of the above outlined type thusly that the coupling is arranged at the inward side of the drive wheel, that the end of the hollow shaft surrounding the axle of the drive wheel is connected with the radially inner ring secured to the rubber-containing components, that the radially outer ring also secured to the rubber-containing components is connected with the hub portion of the drive wheel by way of an annular coupling plate, and that the coupling plate is arranged within an annular recess provided in the drive wheel between the wheel hub and flanged rim in such manner that a gap will remain between the coupling plate and the drive wheel. This specific arrangement proposed by the invention will make a disassembly of the set of wheels very easy and provides, by the manner of connection between coupling plate and hub, a sufficiently great thermal barrier with respect to the friction surfaces of the drive wheel which can heat up considerably when the shoe brakes are applied during braking.

The elastic rubber-containing component can be formed by an annular rubber layer glued between the radially inner and outer rings. It is also feasible to arrange several elastic rubber-containing components in the form of circumferentially spaced segment of an annulus glued to and between the two rings.

In a further development of the invention, cooling ribs are arranged on the coupling plate.

Another further development of the invention is the placement of recesses in the coupling plate in order to increase ventilation of heat from inner side of the wheel disc 1a.

Figure 3:
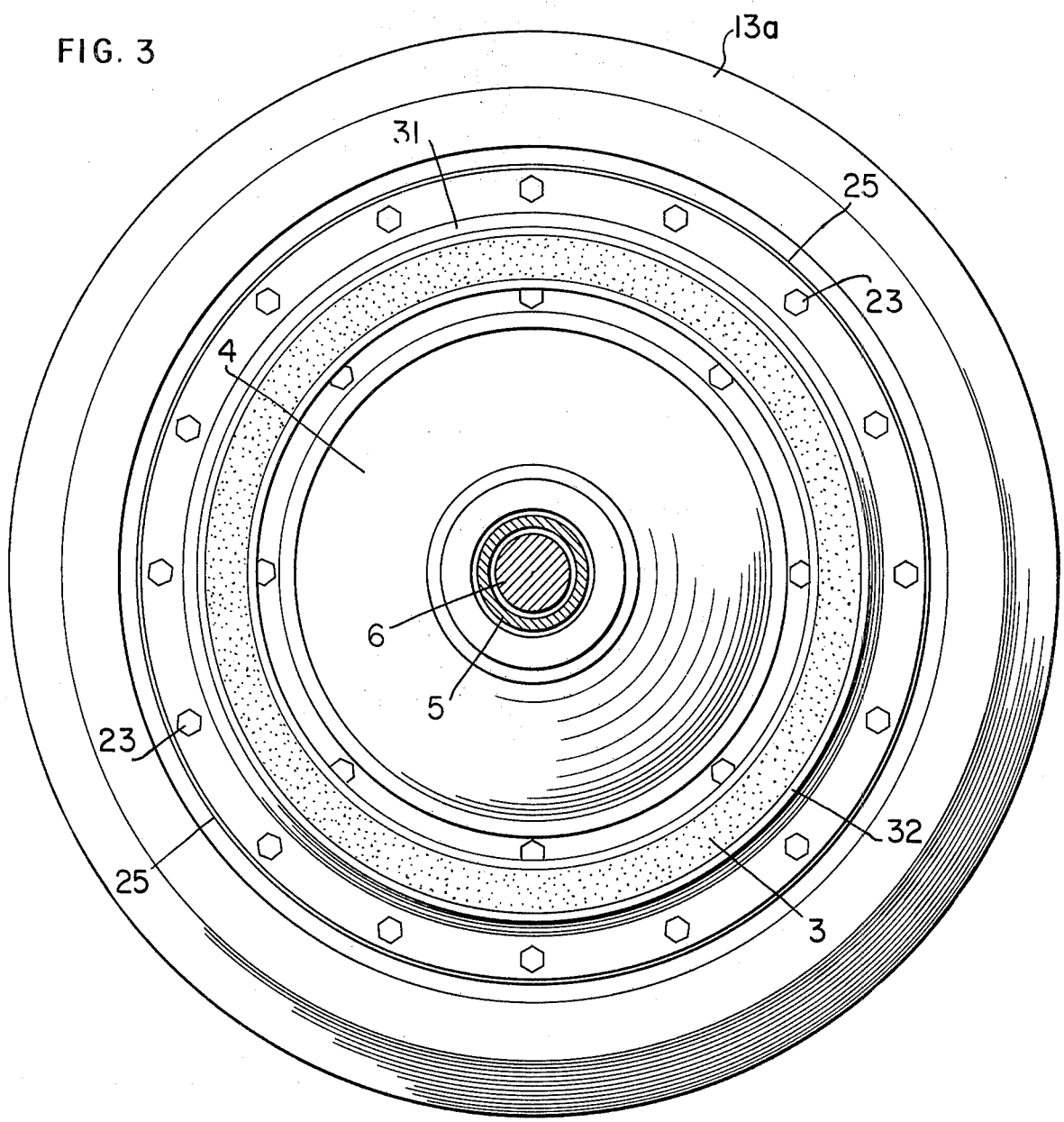
Figure 2:
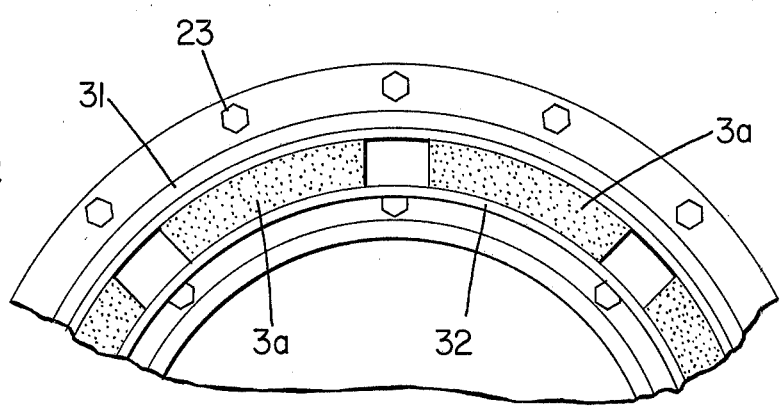

Further details and advantageous developments of the invention are disclosed in two practical examples, described below and illustrated in the accompanying drawing:

FIG. 1 is a view of the powerr train in essentially a half central vertical section of one embodiment of the invention, FIG. 2 is a vew showing a modification of the construction for the elastic component located between the inner and outer rings, and FIG. 3 is a side view of the embodiment of FIG. 1.

With reference to the drawing, a drive wheel of a track-operated vehicle, e.g. a locomotive is shown at 1. The wheel includes a hub 12 mounted on an axle 6, a profiled wheel disc part 1a of relatively smaller width than the hub and a flange 13a on the rim 13 which engages the track.

An annular coupling plate 2 is located adjacent but spaced from the inner side of the wheel disc to prevent transfer of heat from the latter to the former and its inner peripheral portion is seated in a recess 14 provided in one side of the hub and secured there by circumferentially spaced screw bolts 21.

Connected to the outer periphery of the coupling plate 2 by means of circumferentially spaced screw bolts 23 is an outer metallic ring 31 to the inner face of which is vulcanized the outer surface of an annular rubber-containing elastic component 3. The inner surface of this annular elastic component is vulcanized to the outer surface of a radially inner metallic ring 32 and the latter is secured by circumferentially spaced screw bolts to the outer peripheral portion of an annular profiled plate 4 spaced from coupling plate 2. The inner peripheral portion of plate 4 is connected by screw bolts to a flange at the end of the electrically powered hollow drive shaft 5 which surrounds the axle on which the drive wheel 1 is mounted.

It is also feasible to provide a circular array of elastic rubber-containing components in the form of circumferentially spaced segments 3a of an annulus between and glued to the two rings 31, 32 as shown in FIG. 2

In order to cool off the inside of the drive wheel 1, small recesses for ventilation can be provided in the coupling plate 2. The coupling plate 2 can also be provided with fins 25 for cooling the latter.

The improved elastic coupling between the hollow drive shaft and drive wheel can also be adopted for cardan mounted hollow drive shafts as well as to hollow drive shafts supported by bearings.

We claim:

1. In an elastic drive coupling provided between a hollow drive shaft and a drive wheel of a railway track operated vehicle wherein said hollow drive shaft surrounds the axle of the drive wheel and the latter includes a hub and a wheel disc extending generally radially therefrom said wheel disc terminating in a flanged rim for a rolling engagement with the track, the improvement which comprises an annular coupling plate connected to said hub and extending generally radially outwardly therefrom and adjacent to but spaced axially from an inner side of said wheel disc to form a gap therebetween, an outer ring fixed to a radially outer peripheral portion of said coupling plate, an inner ring spaced radially inwardly from said outer ring, a rubber-containing elastic member secured to and between said rings, and said inner ring being connected to said hollow shaft to resiliently transmit traction forces.

2. An elastic drive coupling as defined in claim 1 wherein said rubber-containing elastic memberr has an annular configuration.

3. An elastic drive coupling as defined in claim 1 wherein said rubber-continging elastic member is constituted by a plurality of circumferentially spaced segments of an annulus.

4. An elastic drive coupling as defined in claim 1 wherein said coupling plate is provided with cooling fins.

5. An elastic drive coupling as defined in claim 1 including means for connecting said inner ring to said hollow shaft comprising an annular disc whose outer and inner peripheral portions are secured respectively to said inner ring and hollow shaft.

* * * * *